United States Patent [19]

Baek

[11] Patent Number: 5,766,069

[45] Date of Patent: Jun. 16, 1998

[54] AIR FLOW DIRECTION ADJUSTING APPARATUS FOR AN AIR CONDITIONER

[75] Inventor: Chul-Ho Baek, Suwon, Rep. of Korea

[73] Assignee: Samsung Electronics Co., Ltd., Suwon, Rep. of Korea

[21] Appl. No.: 774,909

[22] Filed: Dec. 27, 1996

[30] Foreign Application Priority Data

Mar. 21, 1996 [KR] Rep. of Korea ................. 96-7775

[51] Int. Cl.$^6$ ........................................ B60H 1/34
[52] U.S. Cl. .................... 454/153; 454/285; 454/319; 62/404
[58] Field of Search ...................... 62/404, 407, 408; 459/153, 155, 285, 315, 319, 321

[56] References Cited

U.S. PATENT DOCUMENTS 5,660,588  8/1997  Kotoh et al. ................. 454/285

*Primary Examiner*—John M. Sollecito
*Attorney, Agent, or Firm*—Burns, Doane, Swecker & Mathis, L.L.P.

[57] ABSTRACT

This invention provides an air blowing direction adjusting apparatus for an air conditioner providing any desired blowing directions for a heat-exchanged air to be discharged indoor, the apparatus including a dynamic force generating unit mounted upon one side of a main body of the air conditioner and having a shaft, cams coupled to the shaft and rotated in a forward or reverse direction with the drive of the dynamic force generating unit, moving units disposed to bring into contact with the cams for conversion of rotary motions of the cams into linear motions of the moving units, whereby the air blowing direction adjusting unit is rotated, and elasticity units coupled to one side of the moving means to resiliently operate on the moving units.

4 Claims, 6 Drawing Sheets

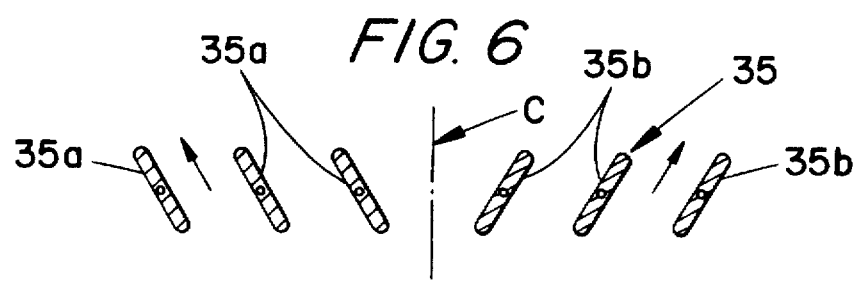
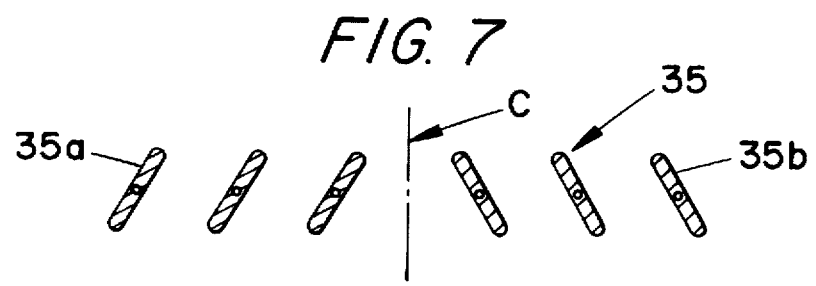
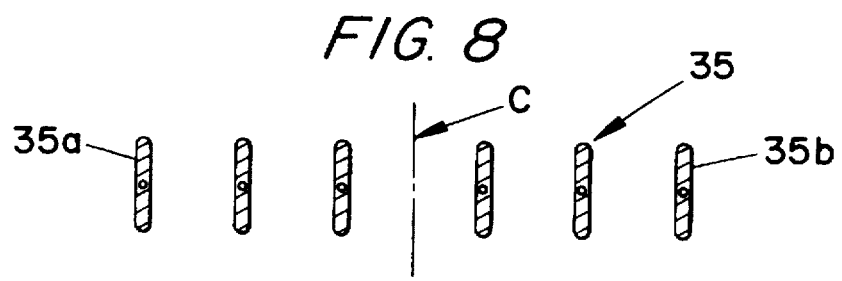

AIR FLOW DIRECTION ADJUSTING APPARATUS FOR AN AIR CONDITIONER

BACKGROUND OF THE INVENTION

1. Field of the Invention

The present invention relates to an air flow direction adjusting apparatus for an air conditioner.

2. Description of the Prior Art

A conventional air conditioner has, as shown in FIGS. 1 to 3, a suction grille member 3 having suction inlets 3a for taking in a room air at a front lower portion of a main body 1, and filtering means 5 mounted upon a rear portion of the suction grille member 3, for filtering any foreign substances contained in the air sucked through the suction inlets 3a of the suction grille member 3. A heat-exchanger 7 is installed in the main body 1, for heat-exchanging the filtered air, and a duct member 9 is installed over the heat-exchanger 7, for guiding the cooled or heated air resulting from passing through the heat-exchanger 7. A fan 11 is rotatably mounted in the duct member 9, for providing a suction force to suck the room air through the suction inlets 3a in the suction grille member 3, and then through the heat-exchanger 7. A first driving means 13 generates a rotary force to drive the fan 13. A first air blowing direction adjusting means 17, in the form of blades 17a, is adapted to be rotated left to right to direct the heat-exchanged air collected in an upper space of the body 1 by way of the duct member 9. A second air blowing direction adjusting means 19 in the form of blades 19a is adapted to be rotated up and down to direct the heat-exchanged air collected in the upper space of the body 1. The blades 17a are arranged in a direction perpendicular to the blades 19a.

Each end of the blade 17a is pivotally secured to one of upper and lower supporting members 21 and 23, wherein the blade 17a is joined to a connecting rod 25 at a lower portion of the blade 17a. Movement of the connecting rod 25 causes blades 17a associated with the connecting rod 25 to be moved, where the movement of the connecting rod 24 is due to the rotation of second driving means 27 mounted upon one side of the lower supporting member 23. And, the second air blowing direction adjusting means 19 is provided to discharge the heat-exchanged air in an up or down direction for thereby accomplishing the heating or cooling of the room.

However, it can be appreciated from FIGS. 3A to 3C that the blowing directions are limited only to three directions of left (FIG. 3C), right (FIG. 3A) and forward (FIG. 3B), not providing any other desired directions for the air to be discharged.

SUMMARY OF THE INVENTION

Therefore, it is an object of the present invention to provide an air blowing direction adjusting apparatus for an air conditioner providing selected blowing directions for a heat-exchanged air to be discharged indoors.

The above object is accomplished by an air blowing direction adjusting apparatus for an air conditioner having air blowing direction adjusting means, the apparatus comprising:

dynamic force generating means mounted upon one side of a main body of the air conditioner and having a shaft;

cams coupled to the shaft and rotated in a forward or reverse direction with the drive of the dynamic force generating means;

moving means disposed in contact with the cams for conversion of rotary motions of the cams into linear motions of the moving means, whereby the air blowing direction adjusting means is rotated; and elasticity means coupled to one side of the moving means to resiliently bias the moving means against the cams.

BRIEF DESCRIPTION OF THE DRAWINGS

Other objects and aspects of the invention will become apparent from the following description of embodiments with reference to the accompanying drawings in which:

FIGS. 6 to 8 are sectional views through the blades to depict three orientations thereof; and FIGS. 6A to 8A are partial plan views of the blade-moving devices in their positions corresponding to FIGS. 6–8, respectively.

DETAILED DESCRIPTION OF THE PREFERRED EMBODIMENT

Figure 1:
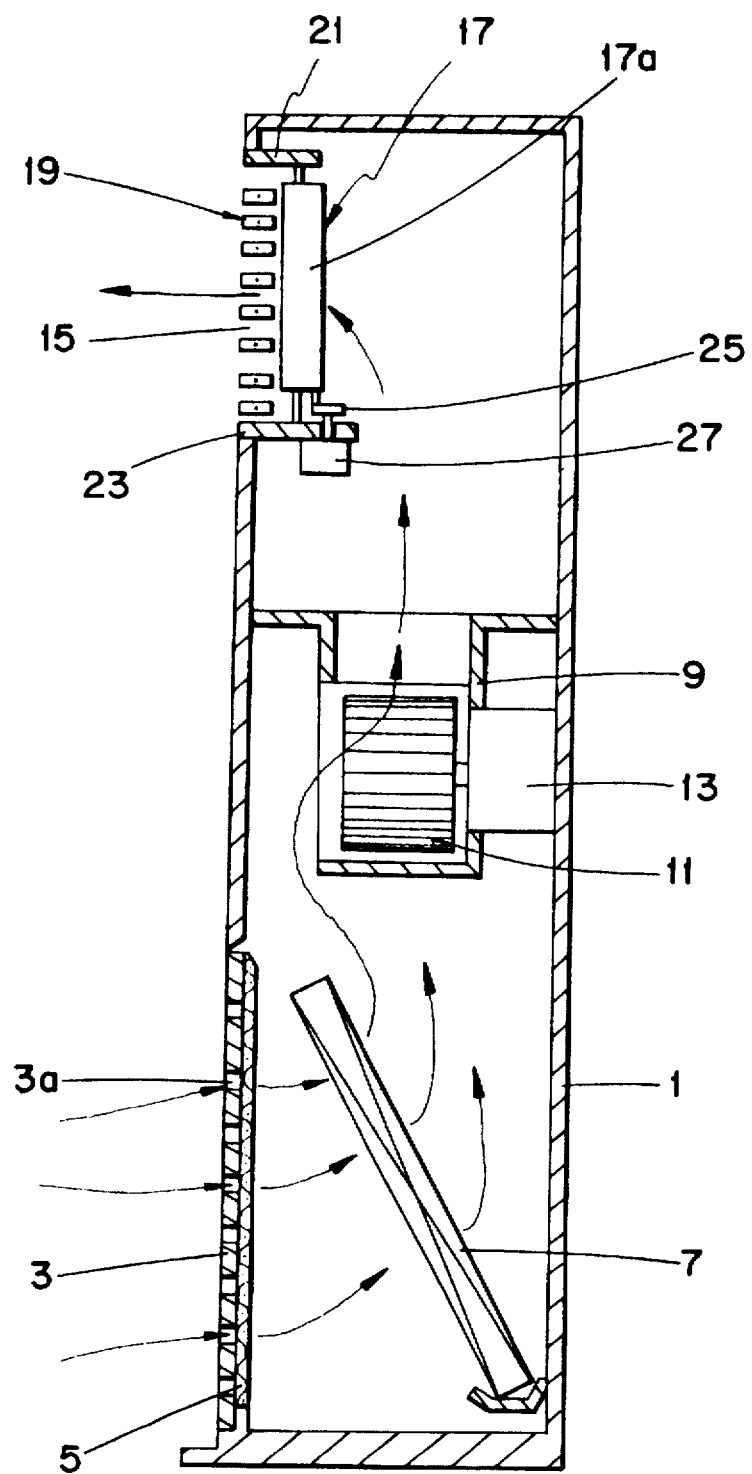
FIG. 1 schematically shows a vertical sectional view of a conventional air conditioner.
Figure 2:
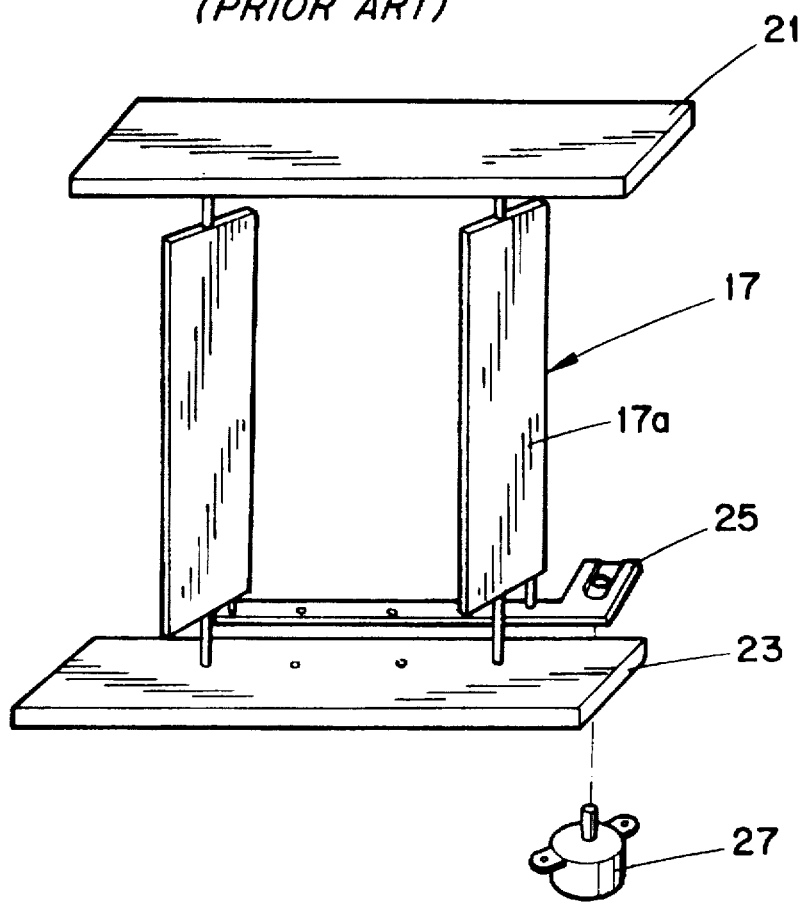
FIG. 2 schematically shows a perspective view of an air blowing direction adjusting apparatus of the conventional air conditioner.
Figure 3A:
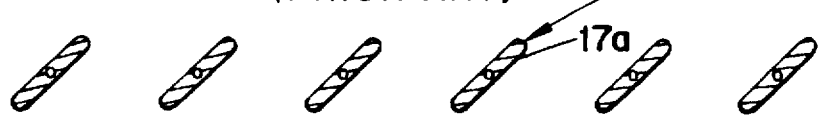
FIGS. 3A to 3C are horizontal sectional views of the air blowing direction adjusting apparatus of the conventional air conditioner, wherein three specific blowing directions provided from the air blowing direction adjusting apparatus are shown, respectively.
Figure 3B:
Figure 3C:

The preferred embodiment according to the present invention will now be described in detail with reference to FIG. 4 through FIG. 8A.

An apparatus according to the present invention includes dynamic force generating means 31 having a shaft 32, cams 33, 34 coupled to the shaft 31 which is rotated in a forward or reverse direction in response to the drive of the dynamic force generating means 31. First and second moving means or actuating members 36 and 37 are brought into contact with respective cams 33 and 34, for exhibiting back and forth reciprocal motions. Such motions are utilized for rotating air blowing direction adjusting means 35 (i.e., a group of blades 35a and a group of blades 35b) coupled to those moving means 36 and 37. Spring means 38, 39 are coupled to ends of respective first and second moving means 36 and 37, applying a resilient force against the first and second moving means 36 and 37.

Concave and convex portions 33a, 34a and 33b, 34b of the cams 33, 34 form irregular cam surfaces to cause the moving means 36, 37 to exhibit their back and forth motions. Spur gears 40 are coupled to one end of respective blades 35a, 35b, in which one group of the spur gears 40 is engaged with a gear 36a formed on the first moving means 36, while the other group of the spur gears 40 engages the other gear 37a formed in a like manner on the means 37.

Figure 4:
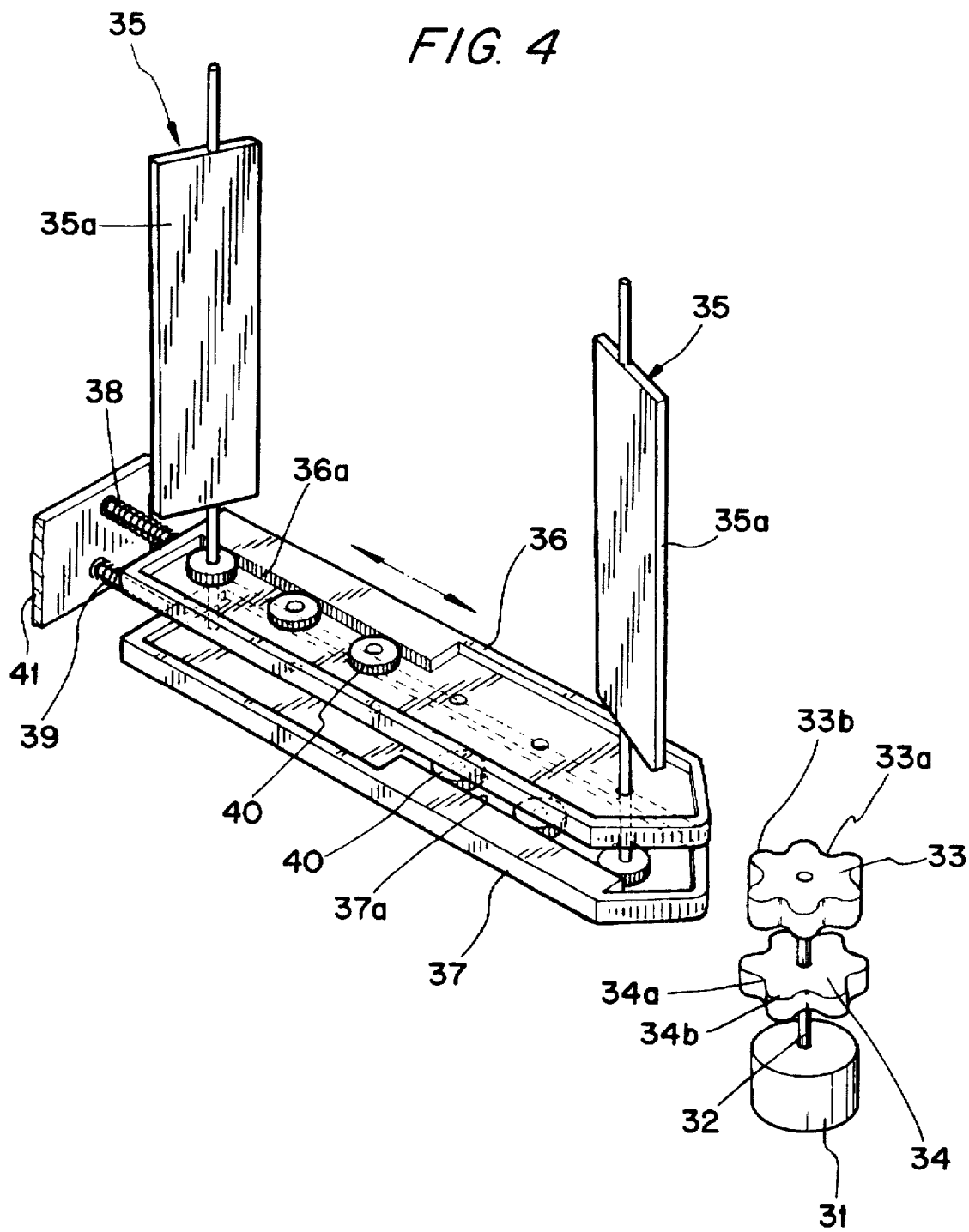
FIG. 4 schematically shows a perspective view of an air blowing direction adjusting apparatus of an air conditioner according to the present invention.
Figure 5A:
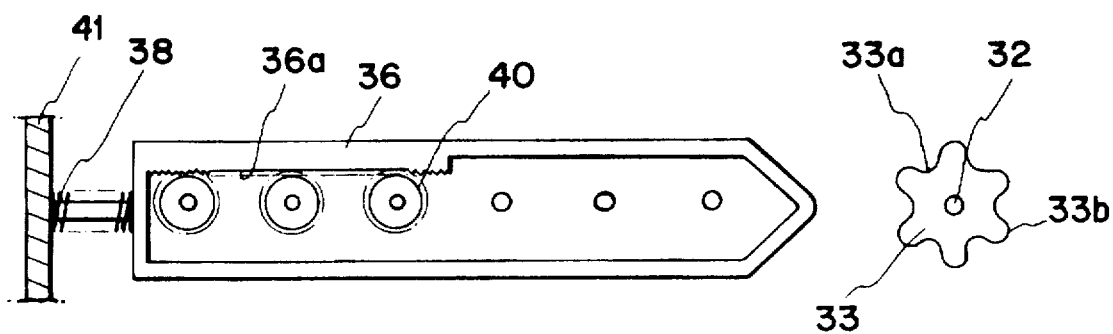
FIGS. 5A and 5B are plan views of respective portions of the FIG. 4 apparatus.
Figure 5B:
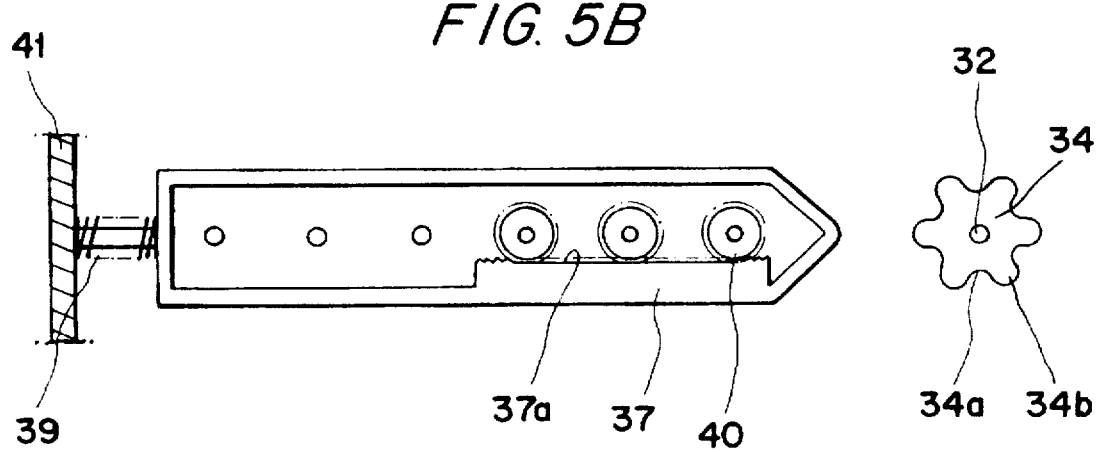

As seen from FIG. 4, one group of three left blades 35a is engaged with the gear 36a formed inside the first moving means 36 which is placed over the second means 37, while another group of three right blades 35b is engaged with the gear 37a.

Reference numeral 41 in FIG. 4 denotes fixing means for supporting the spring means 38 and 39.

Figure 6A:
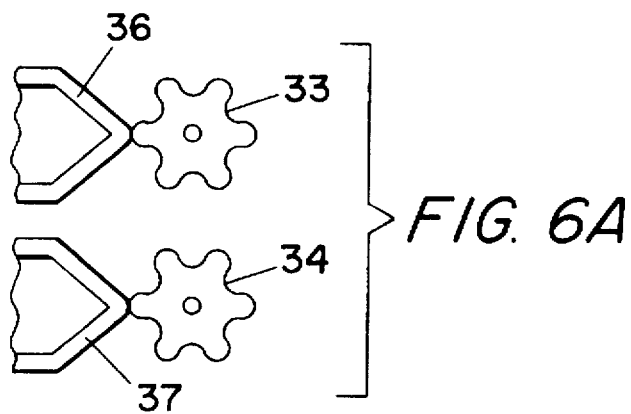
Figure 7A:
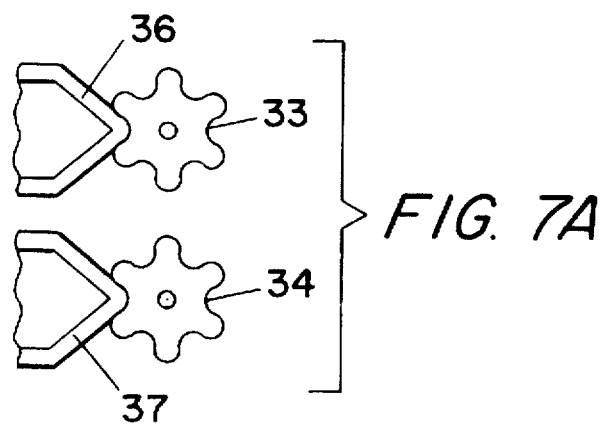

In operation, the activation of the dynamic force generating means 31 rotates the shaft 32 and the cams 33 and 34 coupled to the shaft 32. Concave and convex portions 33a, 34a and 33b, 34b of such cams 33, 34 cause the first and second moving means 36, 37 to exhibit their back and forth motions, or left and right motions as seen from FIG. 4. When both the first and second moving means 36 or actuating members 37 commonly contact the convex portions 33b, 34b, these moving means 36 and 37 are commonly pushed left. This results in counterclockwise and clockwise (i.e., opposite) rotations of the left and right groups of blades 35a, 35b, respectively. FIGS. 6 and 6A show the above-mentioned operation result wherein the discharged air diverges from a center line C. And, the state shown in FIGS. 7 and 7A results from the like operation applied when the first and second means 36, 37 contact the concave portions 33a, 34a and are pushed right, as shown in FIG. 7 wherein the discharged air converges toward the center line C.

Figure 8A:
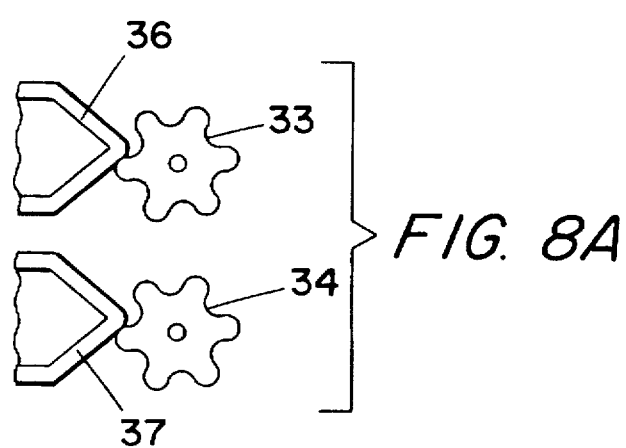

A halfway point in excursion of the moving means 36, 37 from the concave(convex) portion to the convex(concave) portion of the cam corresponds to half a compressed state of the elasticity means 38, 39, with the resultant in FIGS. 8 and 8A illustrating that the blades 35a, 35b are placed parallel to one another and to the center line C. A fully compressed state of the elasticity means 38, 39 is accomplished when the first and second moving means 36, 37 contact the convex portions 33b, 34b of the cams 33, 34 and then are pushed left. The elasticity means 38, 39 can return to their initial states when the first and second moving means 36, 37 bring into contact with the concave portions 33b, 34b of the cams 33, 34 and then are pushed right.

Within one cycle of a 360-degree rotation of the cams 33, 34, the repeated left and right motions of the first and second moving means 36, 37 allow various rotational combinations of the blades (for example, see FIGS. 6–8) to be produced.

The foregoing description is concerned with the left and right motions of the first and second moving means 36, 37 resulting from an employment of the elements of the air blowing direction adjusting means 35, the dynamic force generating means 31 for the means 35, the cams 33, 34, and the first and second moving means 36, 37, and from their organization, but not limited thereto. Up-and-down motions of the blades can be readily effected with an adoption of an arrangement in such a manner that the elements 36, 37 shown in FIG. 4 are vertically positioned.

What is claimed is:

1. An air blowing direction adjusting apparatus for an air conditioner having air blowing direction adjusting means, the apparatus comprising:

dynamic force generating means mounted upon one side of a main body of the air conditioner and having a shaft;

cams coupled to the shaft and rotated in a forward or reverse direction with the drive of the dynamic force generating means, each of the cams including concave portions and convex portions;

moving means operably connected to the air blowing direction adjusting means and disposed to move into contact with respective ones of the cams for conversion of rotary motions of the concave and convex portions into linear motions of the moving means, whereby the air blowing direction adjusting means is rotated; and elastic means coupled to each of the moving means to resiliently bias the moving means toward the respective cam.

2. The apparatus according to claim 1 wherein the concave and convex portions of one of the cams is angularly offset with respect to the concave and convex portions of another of the cams.

3. An air blowing direction adjusting apparatus for an air conditioner having air blowing direction adjusting means, the apparatus comprising:

dynamic force generating means mounted upon one side of a main body of the air conditioner and having a shaft;

cams coupled to the shaft and rotated in a forward or reverse direction by the drive of the dynamic force generating means;

moving means operably connected to the air blowing direction adjusting means and disposed to move into contact with respective ones of the cams for conversion of rotary motions of the cams into linear motions of the moving means, whereby the air blowing direction adjusting means is rotated; and elastic means coupled to each of the moving means to resiliently bias the moving means toward the respective cam;

the moving means comprising groups of gear teeth disposed inside respective moving means each group of gear teeth connecting a respective moving means with some of the air blowing direction adjusting means for rotating the air blowing direction adjusting means in response to linear movement of the respective moving means.

4. The apparatus according to claim 3 wherein each adjusting means includes a spur gear fixedly connected thereto for rotation therewith, the spur gears meshing with respective ones of the groups of gear teeth.

* * * * *